(12) United States Patent
Mohamadi

(10) Patent No.: US 8,573,529 B2
(45) Date of Patent: Nov. 5, 2013

(54) STANDOFF DETECTION OF MOTION AND CONCEALED UNEXPLODED ORDNANCE (UXO)

(75) Inventor: Farrokh Mohamadi, Irvine, CA (US)

(73) Assignee: Farrokh Mohamadi, Newport Beach, CA (US)

( * ) Notice: Subject to any disclaimer, the term of this patent is extended or adjusted under 35 U.S.C. 154(b) by 300 days.

(21) Appl. No.: 13/037,804

(22) Filed: Mar. 1, 2011

(65) Prior Publication Data

US 2011/0210883 A1    Sep. 1, 2011

Related U.S. Application Data

(60) Provisional application No. 61/309,379, filed on Mar. 1, 2010.

(51) Int. Cl.
*B64C 29/00* (2006.01)
(52) U.S. Cl.
USPC .......................... 244/23 A; 244/23 C; 342/21
(58) Field of Classification Search
USPC ............................. 244/23 C, 23 A, 12.1–12.6
See application file for complete search history.

(56) References Cited

U.S. PATENT DOCUMENTS

| | | | | |
|---|---|---|---|---|
| 1,552,742 A * | 9/1925 | Howard | ........................... | 244/21 |
| 2,077,471 A * | 4/1937 | Fink | ............................. | 244/12.3 |
| 4,469,294 A * | 9/1984 | Clifton | ......................... | 244/12.3 |
| 6,364,253 B1 * | 4/2002 | Cavanagh | ...................... | 244/190 |
| 7,830,989 B2 * | 11/2010 | Mohamadi | ..................... | 375/343 |
| 7,884,757 B2 * | 2/2011 | Mohamadi et al. | ........... | 342/175 |
| 7,931,239 B2 * | 4/2011 | Pedersen et al. | .............. | 244/189 |
| 8,322,647 B2 * | 12/2012 | Amraly et al. | ............... | 244/12.4 |
| 2008/0223993 A1 * | 9/2008 | Spirov et al. | ................ | 244/23 A |
| 2008/0252546 A1 * | 10/2008 | Mohamadi | ..................... | 343/853 |
| 2010/0140415 A1 * | 6/2010 | Goossen | ...................... | 244/23 A |
| 2010/0225520 A1 * | 9/2010 | Mohamadi et al. | ............. | 342/21 |
| 2010/0301168 A1 * | 12/2010 | Raposo | ...................... | 244/171.2 |
| 2011/0102233 A1 * | 5/2011 | Johnson | .......................... | 342/22 |
| 2011/0102235 A1 * | 5/2011 | Abdillah et al. | ............... | 342/22 |
| 2011/0115666 A1 * | 5/2011 | Feigin et al. | .................... | 342/22 |
| 2011/0115667 A1 * | 5/2011 | Feigin et al. | .................... | 342/22 |
| 2011/0227778 A1 * | 9/2011 | Mohamadi et al. | ............. | 342/22 |
| 2012/0119935 A1 * | 5/2012 | Mohamadi et al. | ............. | 342/22 |
| 2013/0050007 A1 * | 2/2013 | Ammar | ........................... | 342/22 |

* cited by examiner

*Primary Examiner* — Christopher P Ellis
*Assistant Examiner* — Medhat Badawi
(74) *Attorney, Agent, or Firm* — Haynes and Boone, LLP

(57) ABSTRACT

A surveillance system includes a multi-propeller aircraft having a main propeller and a plurality of wing unit propellers; a housing that houses the main propeller and the wing unit propellers; an ultra-wideband (UWB) radar imaging system; a control system for controlling flight of the multi-propeller aircraft from a remote location; and a telemetry system for providing information from the ultra-wideband (UWB) radar imaging system to the remote location. A method includes: remotely controlling flight of the aircraft using a main propeller and a plurality of wing unit propellers with airflow from the main propeller to the wing unit propellers for lift and propulsion; operating an ultra-wideband (UWB) radar imaging system from the aircraft; and transmitting information from the UWB radar imaging system to a display at a location remote from the aircraft.

14 Claims, 7 Drawing Sheets

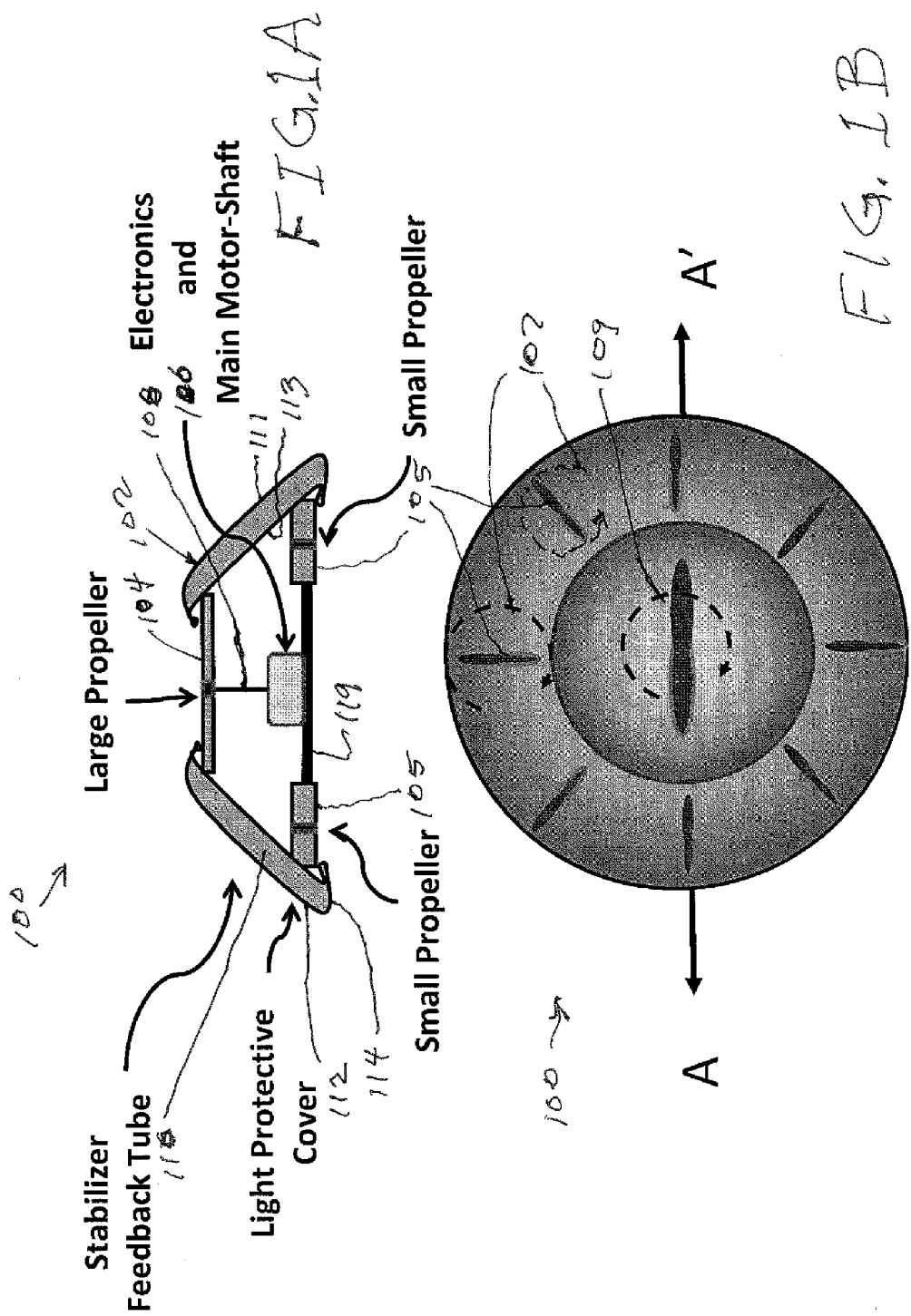

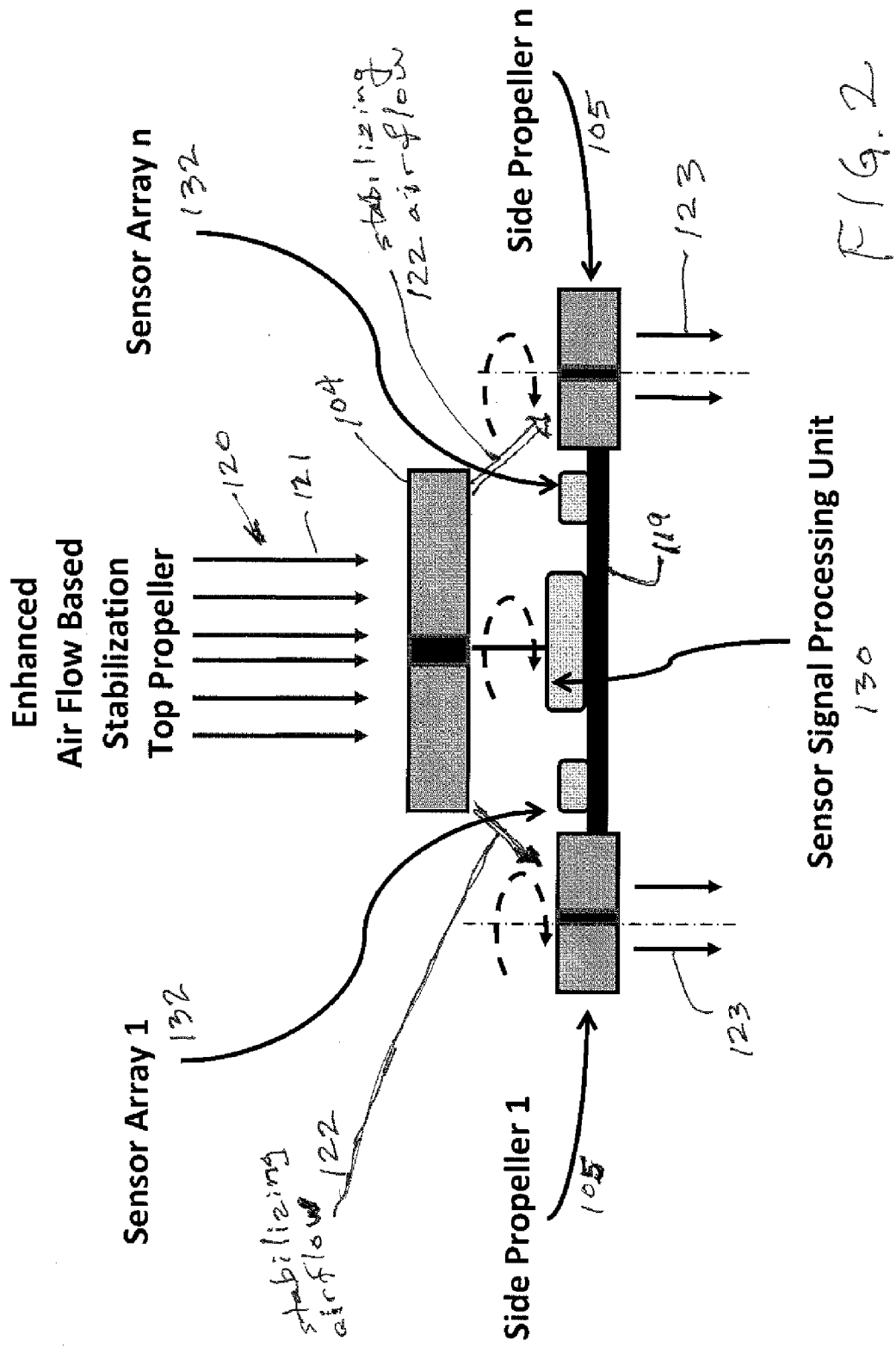

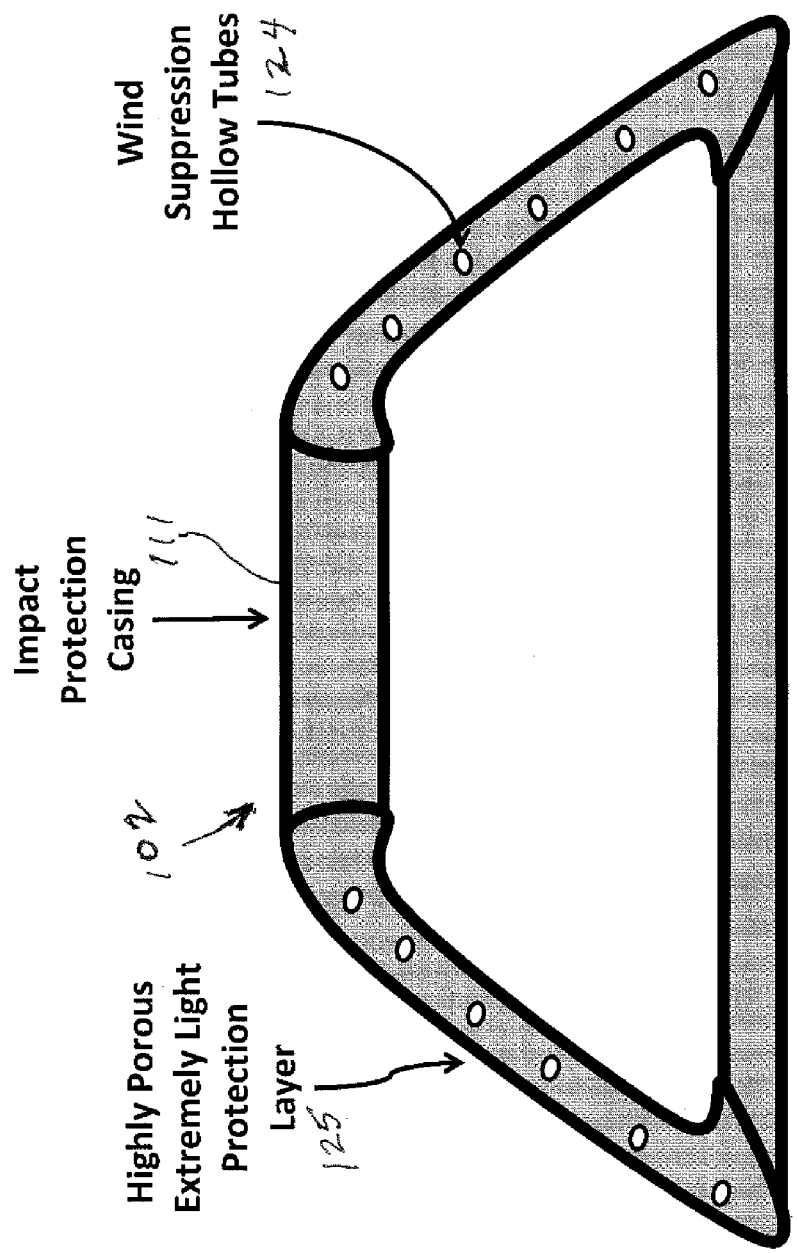

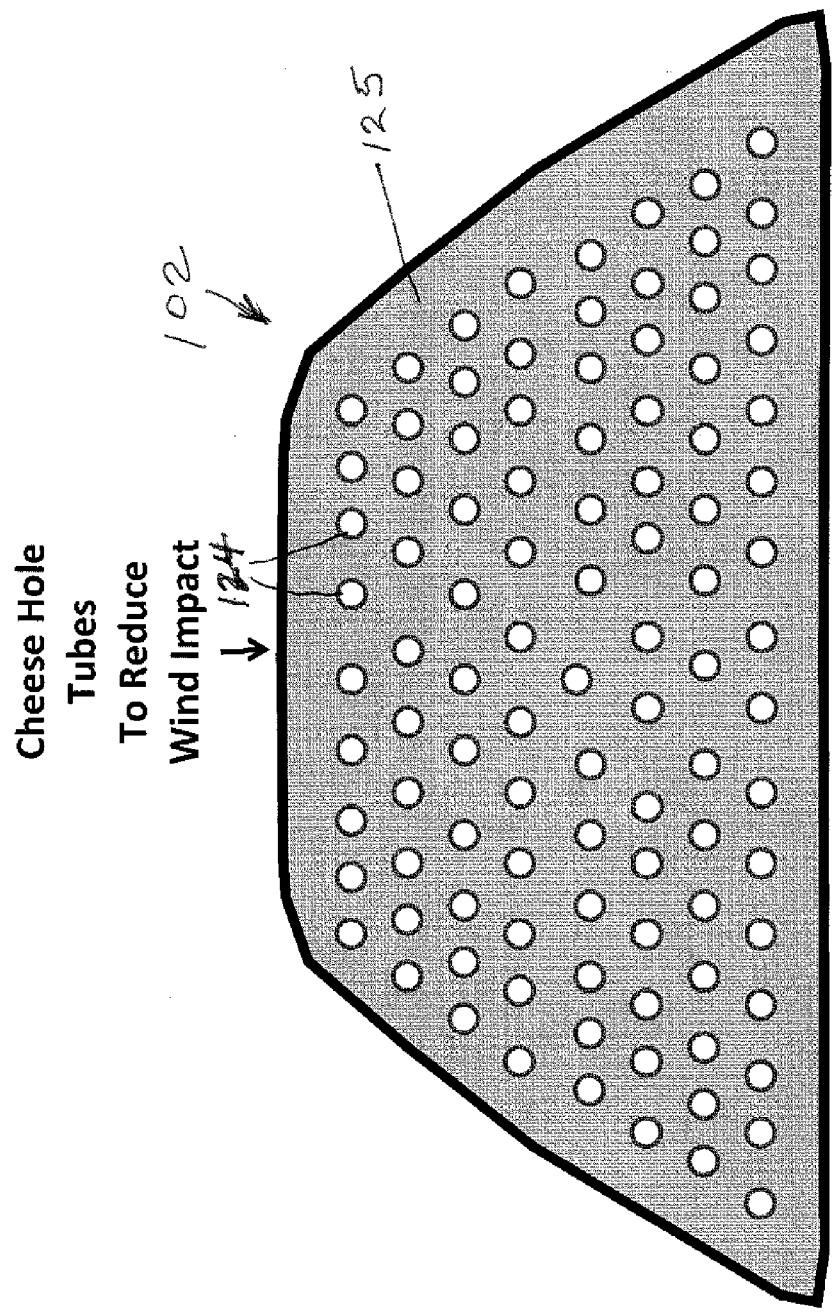

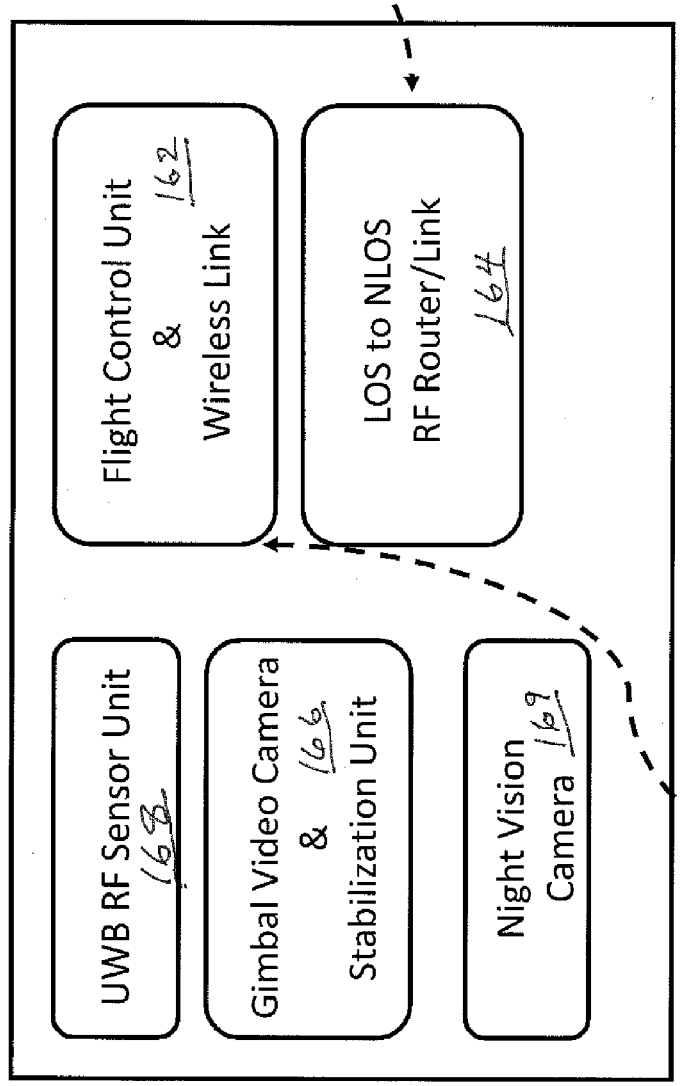
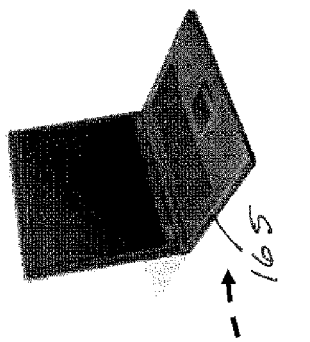
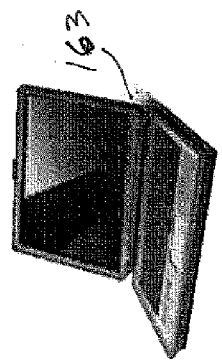
FIG. 7

STANDOFF DETECTION OF MOTION AND CONCEALED UNEXPLODED ORDNANCE (UXO)

CROSS REFERENCE TO RELATED APPLICATIONS

This application claims the benefit of U.S. Provisional Application No. 61/309,379, filed Mar. 1, 2010, which is incorporated by reference. In addition, this application is related to the following co-pending applications, which are incorporated by reference: U.S. patent application Ser. No. 12/852,440, filed Aug. 6, 2010; U.S. patent application Ser. No. 12/732,163, filed Mar. 25, 2010; and U.S. patent application Ser. No. 12/649,268, filed Dec. 29, 2009.

BACKGROUND

The present disclosure generally relates to radio frequency (RF) detection and ranging (RADAR) and, more particularly, to providing surveillance information to an operator at a safe distance from hostile armed individuals who may have weapons, for example, or dangerous objects such as unexploded ordnance (UXO).

Portable, hand-held radars have been used for detection of hidden objects, e.g., objects such as weapons hidden behind a wall of a building. Such technology may be useful in situations where surveillance of an inhabitable area from behind a building wall may be desired, for example, for detecting illegal activities such as smuggling or illegal border crossings or, for example, detecting the presence of hostile individuals in a war zone or terrorist situation.

In some situations, e.g., police work, military combat scenarios, or fire and rescue situations, it may be desirable to be able to detect living individuals, and various objects that may be in their possession using a portable, hand-held radar system from outside a building, for example, occupied by the individuals. In other situations, such as the well-known problem of disposing of hidden landmines left over from past conflicts, it may be desirable to be able to detect unexploded ordnance. Many such situations, however, can expose the operator of a portable, hand-held radar system to grave danger and unacceptably high risks.

SUMMARY

According to one embodiment, a system includes: a multi-propeller aircraft having a main propeller and a plurality of wing unit propellers; a housing that houses the main propeller and the wing unit propellers; an ultra-wideband (UWB) radar imaging system housed in the housing; a control system, housed in the housing, for controlling flight of the multi-propeller aircraft from a remote location; and a telemetry system, housed in the housing, for providing information from the ultra-wideband (UWB) radar imaging system to the remote location.

According to another embodiment, a method includes: remotely controlling flight of an aircraft using a main propeller and a plurality of wing unit propellers for lift and propulsion; operating an ultra-wideband (UWB) radar imaging system from the aircraft; and transmitting information from the UWB radar imaging system to a display at a location remote from the aircraft.

According to a further embodiment, an unmanned aerial vehicle includes: a ground plate; a plurality of wing propeller units attached to the ground plate; a housing attached to the ground plate; a main propeller unit connected, directly or indirectly, to the ground plate and disposed to provide a portion of airflow to the wing propeller units; and a control system in communication with the main propeller unit and the wing propeller units and providing flight control by adjustment of the speed and thrust from all of the propeller units concurrently.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 1A is a cross sectional diagram, taken along line A-A' in FIG. 1B, of a standoff surveillance system apparatus in accordance with one embodiment;

FIG. 1B is a plan view diagram of a standoff surveillance system apparatus in accordance with one embodiment;

FIG. 2 is a side view diagram of system components of a standoff surveillance system apparatus in accordance with an embodiment;

Embodiments and their advantages are best understood by referring to the detailed description that follows. Like reference numerals are used to identify like elements illustrated in one or more of the figures.

DETAILED DESCRIPTION

Figure 5:
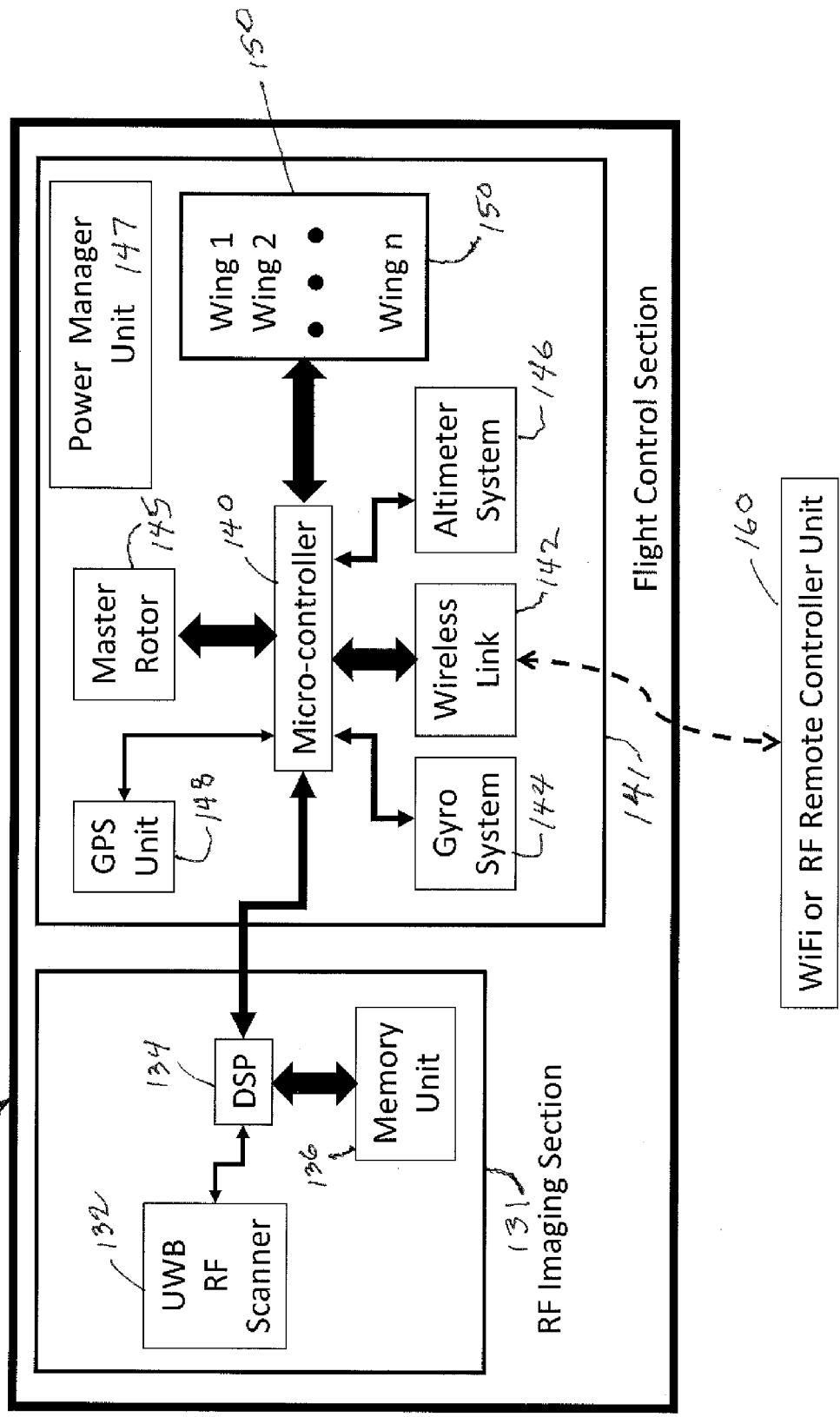
FIG. 5 is a system diagram illustrating one example of a system architecture for a standoff surveillance system in accordance with an embodiment.

In accordance with one or more embodiments of the present invention, systems and methods disclosed herein provide means for standoff detection of inanimate objects of interest, e.g., unexploded ordnance (UXO), and living individuals—as well as means for discriminating between the two—using a sensing apparatus, e.g., unmanned aerial vehicle (UAV), that can be remotely controlled to keep the operator out of danger, e.g., from explosives or hostile individuals, to which an operator using a portable, hand-held surveillance unit would be exposed. The term "standoff" is used to indicate use of a surveillance sensing apparatus that can, for example, be flown by an operator at a safe distance from the operator to place the surveillance system sensing apparatus in a position that would otherwise be dangerous or inaccessible to the operator for detecting objects and individuals of interest. In one or more embodiments, the surveillance system sensing apparatus may include multiple sensors, such as a combination of a 5 Giga Hertz (GHz) ultra-wideband (UWB) radar imaging system, a very high frequency, e.g., 60 GHz ultra-wideband radar imaging system, and off-the-shelf optical zooming devices where optical zooming is switchable and the video image is fused to the RF image using 60 GHz radar zooming by applying a very narrow RF beam. The radiated power of an RF imager in one embodiment may be less than 100 microwatts (uW). Dimensions for a circular UAV of one embodiments may be within a 1 foot to 2 foot radius, depending on the payload and weight excluding the electronics may less than 3 pounds (lb). A number of multi-sensor and compact radar systems are disclosed in co-pending U.S. patent applications, including: U.S. patent application Ser. No. 12/852,440, filed Aug. 6, 2010; U.S. patent application Ser. No. 12/732,163, filed Mar. 25, 2010; and U.S. patent application Ser. No. 12/649,268, filed Dec. 29, 2009, all of which are herein incorporated by reference.

In one or more embodiments, a multi-propeller system may accomplish easy, noiseless take-off and landing of embedded ultra-wideband radar imaging systems for covert monitoring of the existence of living individuals and other objects on a premises, or survey of a building for its layout from outside of the premises. For example, the system may address problems of quiet take off and landing on a roof or a sloped area and may be controlled remotely by a wireless radio system. The surveillance system apparatus can also enable detection of highly reflective material such as metallic cased UXO, or detection of intrusion underground such as tunneling. Embodiments may be used to identify objects, such as a weapon or UXO, identify and differentiate multiple individuals, track the individuals' motion and display the tracking in real time to a remote operator using telemetry.

Embodiments may be useful, for example, to persons outside a building (e.g., fire, rescue workers, military, police, border patrol, or others) requiring surveillance or intelligence data (e.g., detection of living persons and various objects that may be in their possession) regarding individuals occupying a building when entering the building is not practical, permissible, or safe—such as for rescue workers trying to locate earthquake victims trapped inside damaged buildings. Embodiments may be useful in such situations particularly when close approach to the area of interest is unsafe, e.g., in the case of identifying UXO, or inaccessible, e.g., in the case of collapsed buildings or buildings guarded by hostile individuals.

FIG. 1 illustrates a standoff surveillance system 100 including a UAV 102 (also referred to as multi-propeller aircraft 102) that may be used to fly electronics 106 for surveillance system 100 to remote locations according to one or more embodiments. Standoff surveillance system 100 may include a housing 112 that may house the electronics 106 for an RF imaging and flight control system 130 (see FIG. 5) and other system components such as main propeller 104, wing unit propellers 105, main motor shaft 108, and ground plate 119. In one implementation, the wing unit propellers 105 may be a pair of coaxial propellers with counter spinning capability to double the air flow and neutralize the torque. In another implementation, every other wing unit propeller 105 may be spinning opposite to the previous one in sequence around the periphery of ground plate 119 to neutralize the torque. In a third implementation, the main propeller 104 may be balanced by the wing unit propellers 105. Housing 112 may include a light weight protective cover 125 (see FIGS. 3 and 4) encasing its outer surface 111. The surface of the cover 125 may be tiled with solar cells, which may be connected to an internal rechargeable battery for prolonged operations. The outer edge of the ground plate 119 may be buffered with a soft plastic bumper 114, which may be attached to housing 112 for smooth landing of the aircraft 102. Housing 112 may also have an inner surface 113 which may be shaped to direct an airflow 122 (see FIG. 2) from the main propeller 104 into wing unit propellers 105. Housing 112 may also include one or more stabilizer feedback tubes 110 for directing airflow between the main propeller 104 and the wing unit propellers 105. For example, the air flow may be through the main large propeller 104 and a portion of outflow air may be fed back to the smaller propellers 105 through a narrow tube 110 for stability. Direction of rotation (indicated be arrows 107 and 109) and rate of rotation of each propeller may be controlled for stable take-off and landing. As indicated by arrows 107 and 109 some of the propellers may be counter rotating with respect to each other for control of the overall net torque and rotational inertia for all of the propellers.

FIG. 2 is a side view diagram of system components that may be housed in a housing 112 of a standoff surveillance system 100. FIG. 2 shows a general layout of components on a supporting ground plate 119, to which the components may be attached and to which the housing 112 may also be connected, either directly or indirectly, for support of the housing 112. In an alternative embodiment, the housing 112 may provide support for components that are attached to it and held, for example, by ground plate 119. As seen in FIG. 2, the supported components may include sensor arrays 132 (see also FIG. 5) which may include, for example, UWB radar scanners, video and audio inputs such as cameras and microphones, night vision cameras, global positioning system (GPS) units, altimeters, and gyro systems. The supported components may include sensing, flight control, and telemetry system 130 (also referred to as "sensor signal processing unit" or "RF scanner and control system" as in FIG. 5). FIG. 2 also shows more clearly airflow 120 through the propellers 104 and 105, comprising entry airflow 121, stabilizing airflows 122, and exit airflows 123. As may be seen from FIG. 2, most of the components are mounted near the ground plate, so that the center of gravity is very close to the ground plate, which is low in the UAV 102, for stability.

Figure 3:
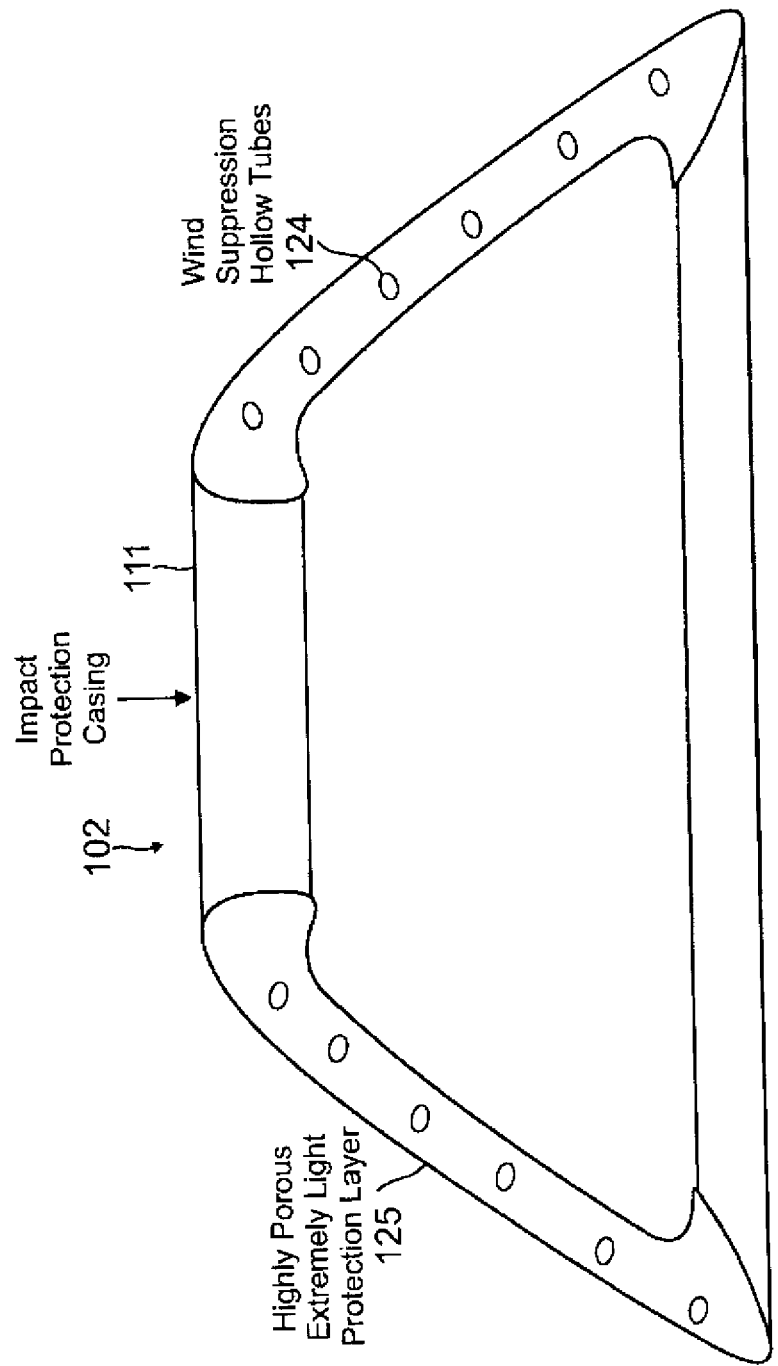
FIG. 3 is a side sectional view toward an interior of a housing for a standoff surveillance system apparatus in accordance with an embodiment.
Figure 4:
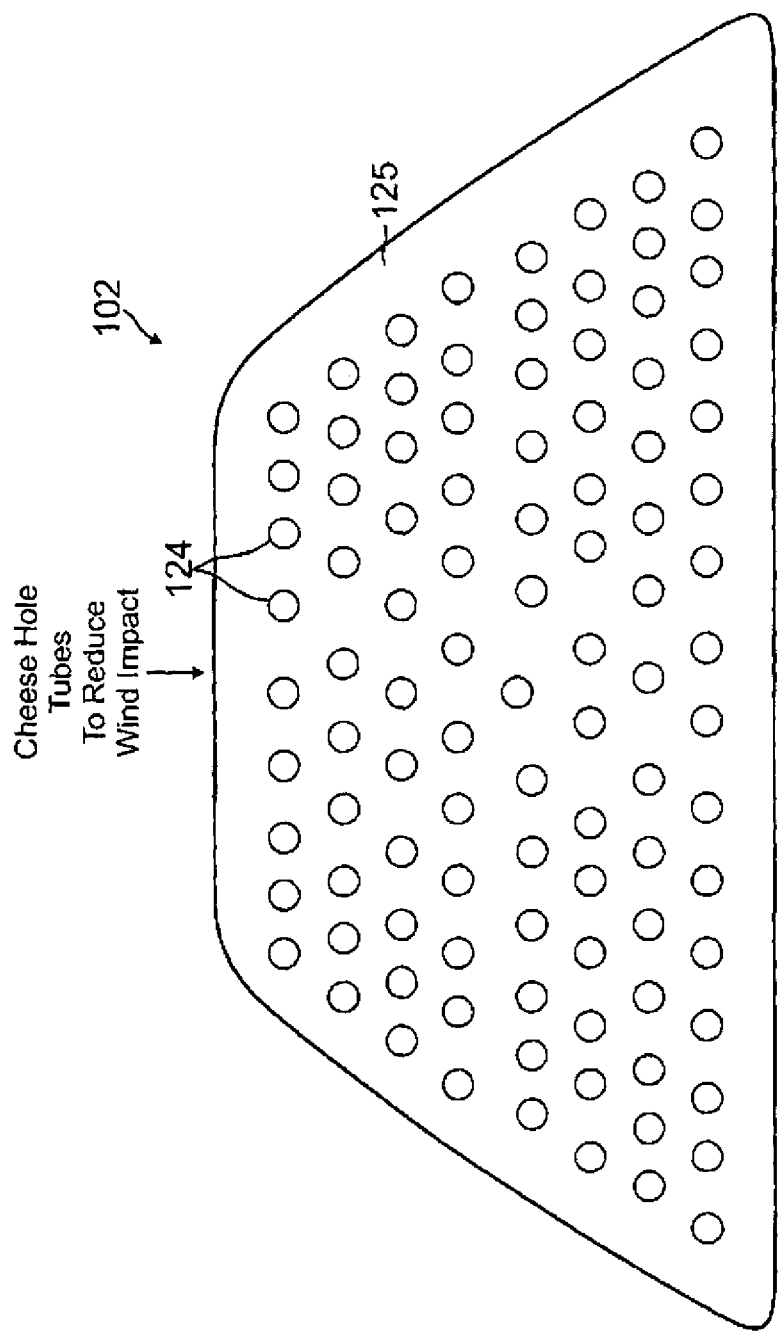
FIG. 4 is a side view of an exterior of a housing for a standoff surveillance system apparatus in accordance with an embodiment.
Figure 5:
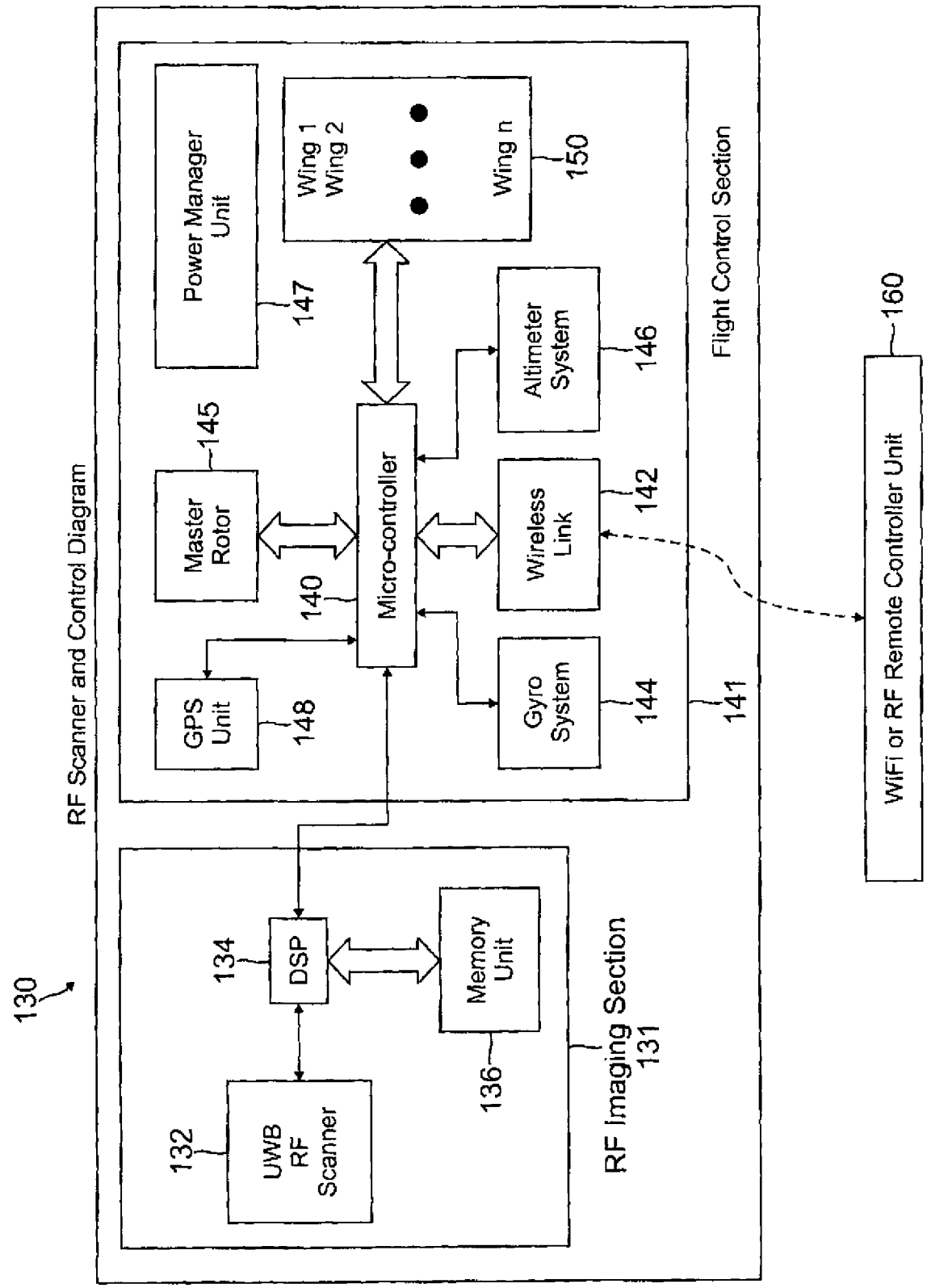

FIG. 3 shows an interior of a UAV 102 and FIG. 4 shows an exterior of a UAV 102 for a standoff surveillance system 100. FIGS. 3 and 4 show wind suppression hollow tubes 124 that open through the protective cover 125 to the outer surface 111 of UAV 102. Protective cover 125 may provide impact protection for UAV 102 and may rendered porous—for example, with regard to cross winds—and lighter in weight by the openings of hollow tubes 124. In one implementation the tubes 124 may be formed to collect the wind (large area inlet) and spray jet (smaller cross section outlet) back the air to resist the wind. The number of tubes 124 may be very large, while the weight of each tube may be ultra light. In another implementation, the tubes 124 may form a large honeycomb type structure that passes the air through and provides almost no resisting surface to the wind, while mechanically supporting the UAV 102 against shock.

FIG. 5 illustrates one example of a system architecture for a standoff surveillance system 100 for a sensing, flight control, and telemetry system 130. Sensing, flight control, and telemetry system 130 may include an RF imaging section 131 and a flight control section 141, which may communicate wirelessly via a remote controller unit included in control system 160 (see also FIG. 7). Wireless control system 160 may conform, for example, to any of the open standards or may be a proprietary control system. Wireless network connectivity may be provided by a wireless control system 160.

RF imaging section 131 may include one or more UWB RF scanners (e.g., sensor array 132) such as, for example, the 5 GHz or 60 GHz systems referenced above. The UWB RF scanner (sensor array unit 132) may be connected to a digital signal processing (DSP) unit 134, which may access a memory unit 136 comprising, for example, a random access memory (RAM). The DSP unit 134 may communicate, as shown in FIG. 5, with flight control section 141.

Flight control section 141 may include a micro-controller 140. Micro-controller 140 may integrate all sensory and control inputs from the components of flight control section 141 and may provide control and telemetry outputs for UAV 102. As shown in FIG. 5, micro-controller 140 may receive inputs from wireless link 142, which may provide operator control inputs from an operator at a remote location using, for example, a wifi or RF remote controller unit of wireless control system 160. Micro-controller 140 may receive additional control and stabilizing inputs, for example, from gyro system 144 and altimeter system 146. Micro-controller 140 may receive position or location data from GPS system 148. For example, inputs from GPS system 148 may enable UAV 102 to report its position via telemetry and to be monitored over Google® maps, for example, using GPS.

Figure 6:
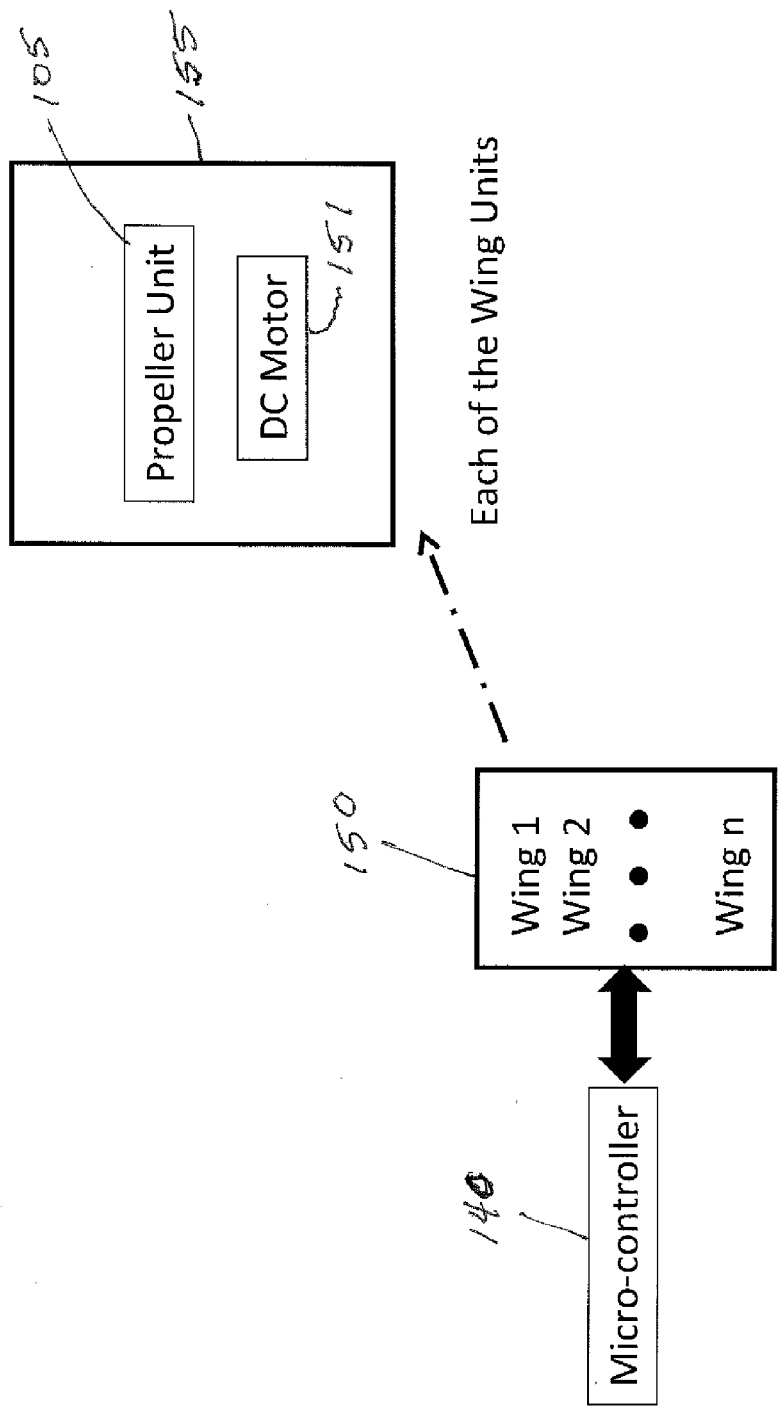
FIG. 6 is a system diagram illustrating the wing propeller units shown in FIG. 5 in more detail, in accordance with one embodiment.

Micro-controller 140 may provide control outputs and receive feedback inputs from master rotor unit 145 and wing propeller units 150. Master rotor unit 145 may include the main propeller 104, a main motor and motor shaft 108, and an electronic speed control (ESC) for driving the motor. Similarly, as shown in FIG. 6, each wing propeller unit 155 of the plurality of wing propeller units 150 may include a wing unit propeller 105, a DC motor 151 and an ESC (not shown) for driving the motor. Each wing propeller unit 155 may include a local controller and a micro-electro mechanical (MEM) based gyro or accelerometer (not shown).

Flight control section 141 may also include a power manager unit 147 for providing and regulating electrical power to any of the systems of UAV 102.

Figure 7:
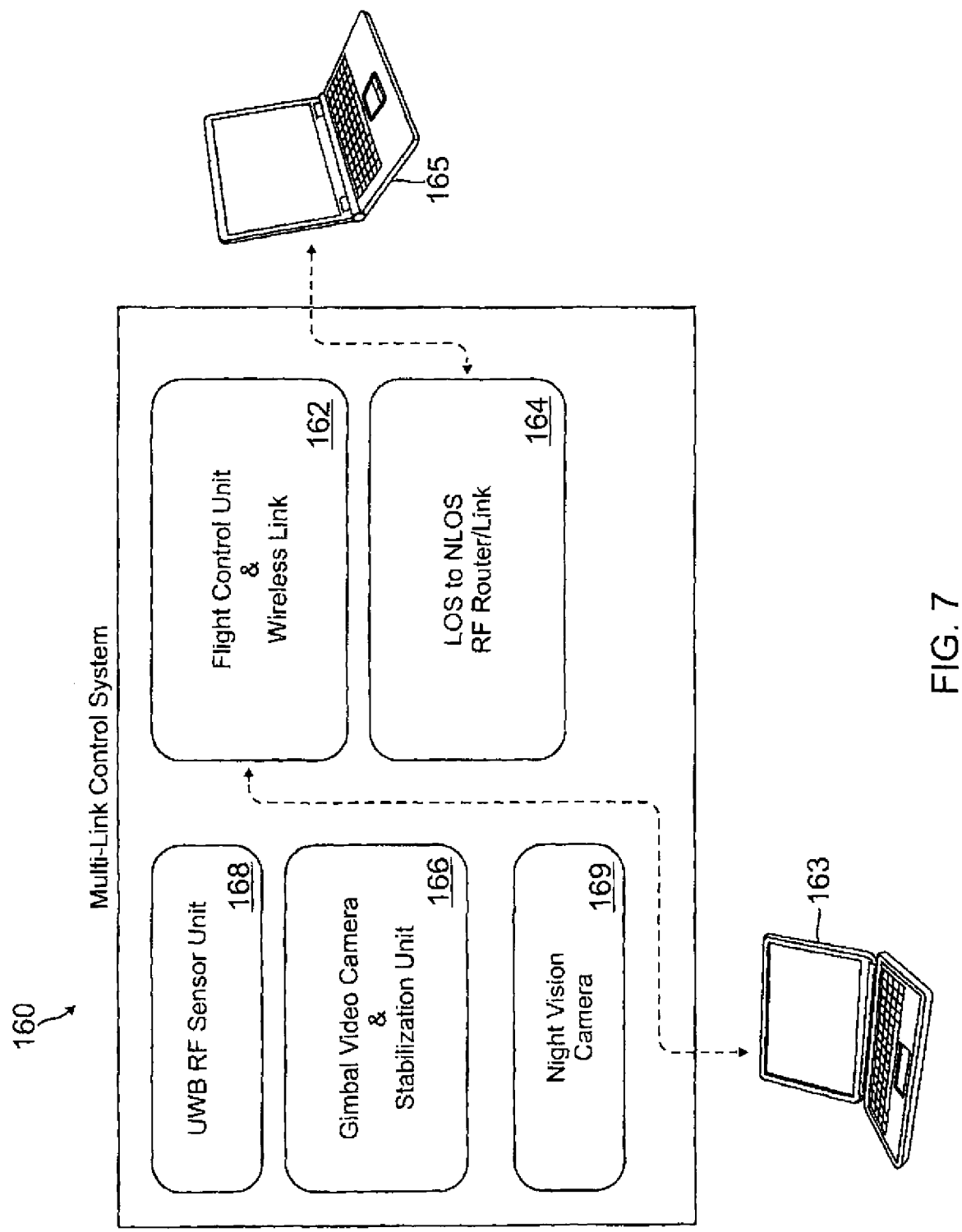
FIG. 7 is a system diagram illustrating one example of a system architecture for a system interface and remote control for a standoff surveillance system in accordance with one embodiment.

FIG. 7 illustrates one example of a multi-link wireless control system 160 for standoff surveillance system 100. Multi-link wireless control system 160 may include a system interface display (e.g., devices 163, 165) for providing surveillance information to a user from an RF imaging system or other surveillance systems (e.g., video, audio) on UAV 102. Control system 160 may provide a system interface for one or more operators using display and input devices 163 and 165 to communicate with and control UAV 102 at a location remote from UAV 102. The remote controller may be a laptop or hand-held system as illustrated by devices 163, 165 shown in FIG. 7, or a device that provides joy stick controls, for example, for the rate of rotation for each of propellers 104, 105. For example, flight control may be provided by adjustment of the speed and thrust from all of the propeller units concurrently under direction of micro-controller 140, which may interpret signals from the joysticks to co-ordinate the adjustments.

Multi-link wireless control system 160 may provide links, as shown, for a UWB radar RF sensor unit 168, gimbal video camera and stabilization unit 166, night vision camera 169, flight control unit 162, and line-of-sight (LOS) to non-line-of-sight (NLOS) router link 164. Each of these units may, for example, process telemetry data or interface control inputs to a corresponding unit on UAV 102. Interface display 163, for example, may provide first person view (FPV) control and direct visual flight control for UAV 102 as well as display telemetry data such as RF imaging from the UWB radar sensors on board the UAV 102. Interface display 165 may provide an LOS to NLOS router link for UAV 102.

Embodiments described herein illustrate but do not limit the disclosure. It should also be understood that numerous modifications and variations are possible in accordance with the principles of the present disclosure. Accordingly, the scope of the disclosure is best defined only by the following claims.

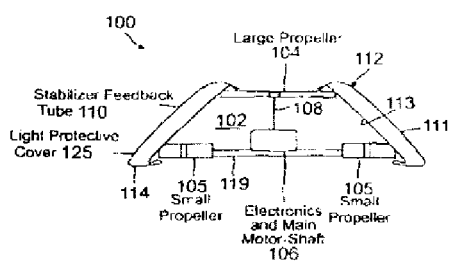

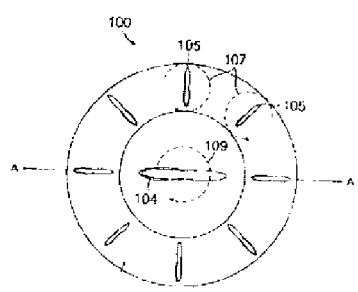

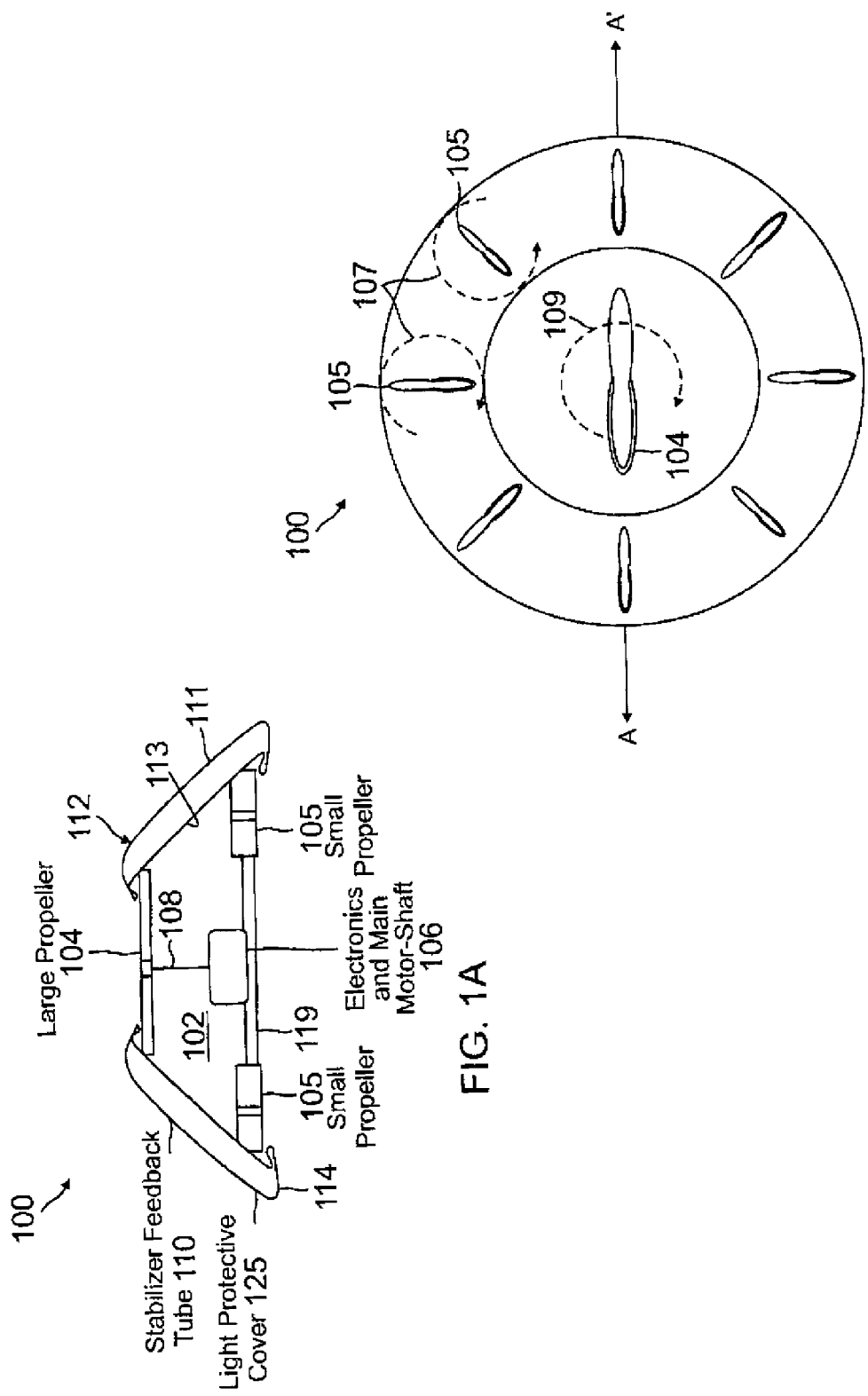

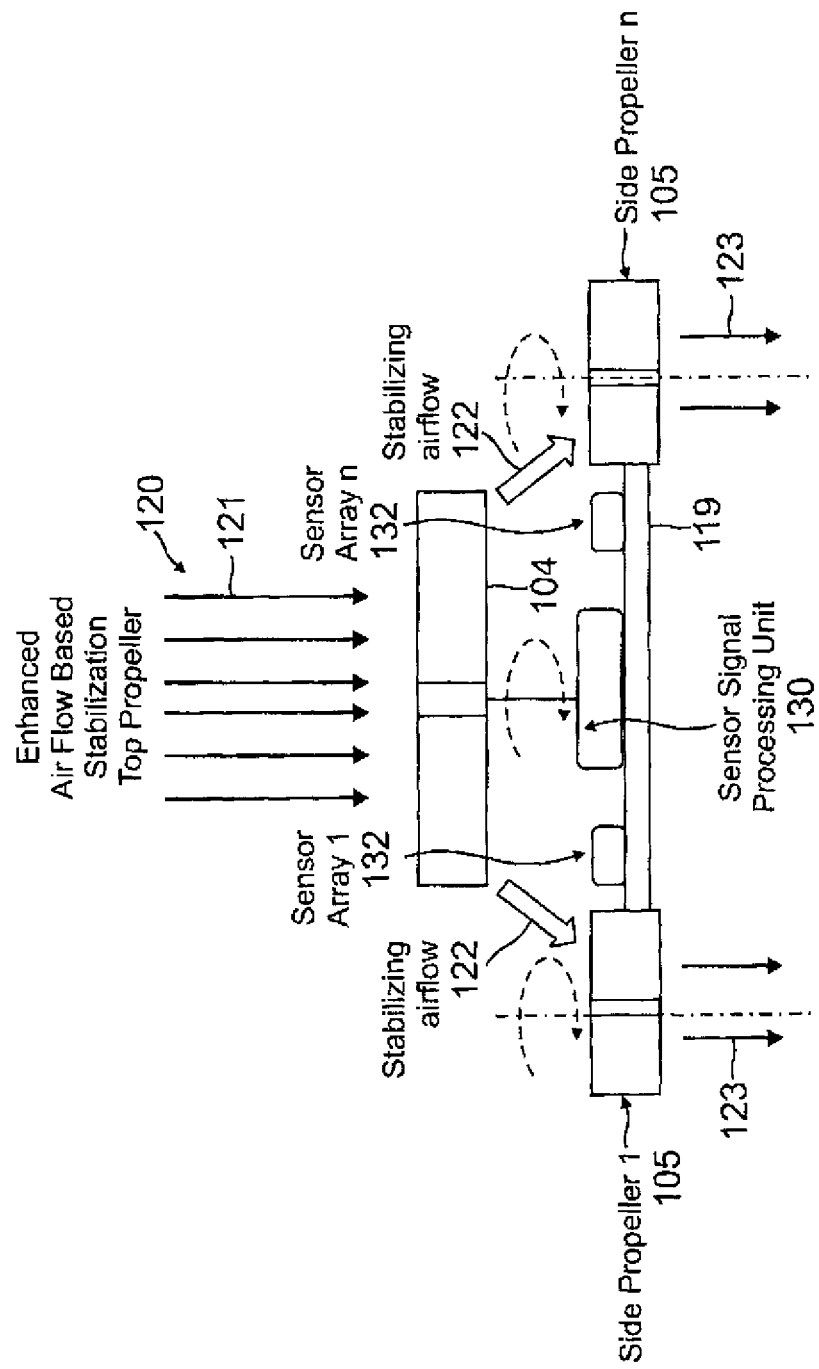

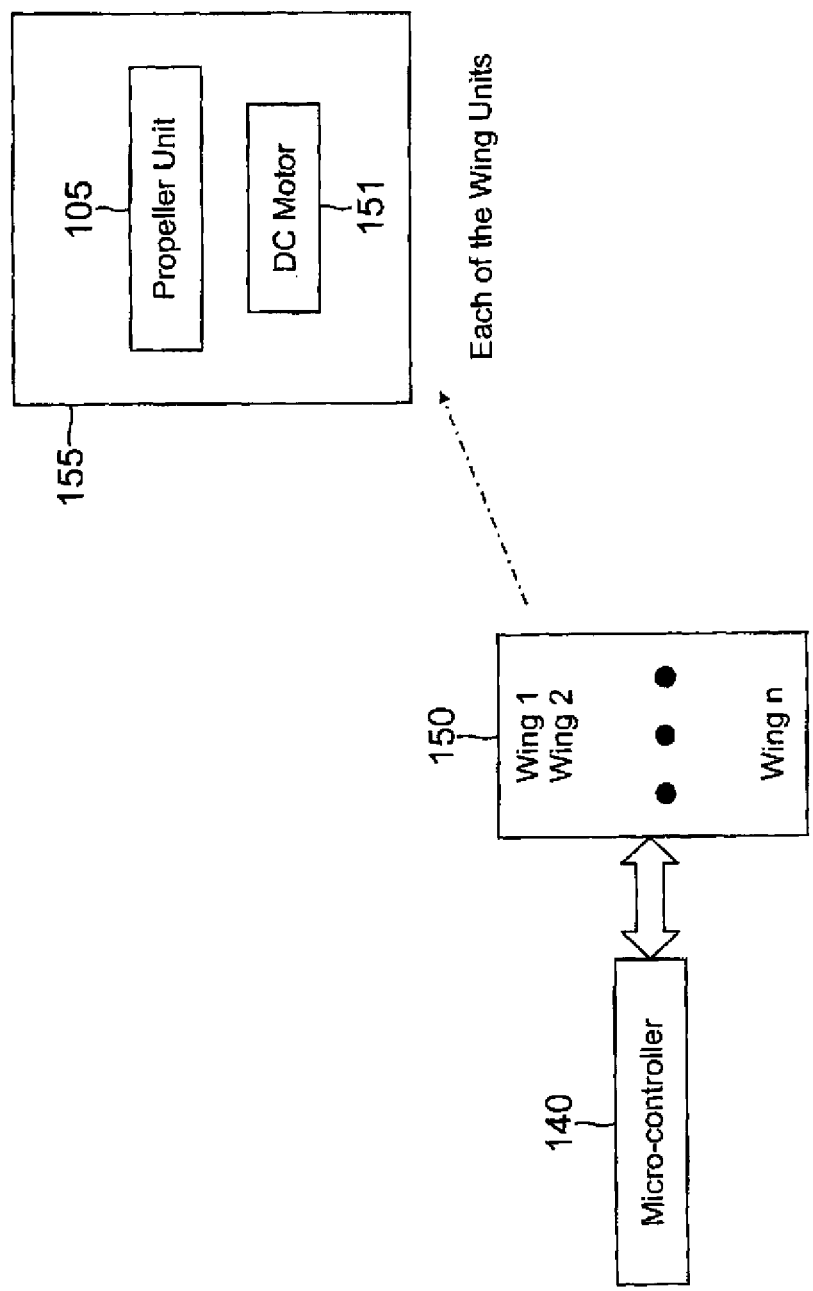

I claim:

1. A system comprising:
    a multi-propeller aircraft having a main propeller and a plurality of wing unit propellers;
    a housing that houses the main propeller and the wing unit propellers;
    an ultra-wideband (UWB) radar imaging system housed in the housing;
    a control system, housed in the housing, for controlling flight of the multi-propeller aircraft from a remote location; and
    a telemetry system, housed in the housing, for providing information from the ultra-wideband (UWB) radar imaging system to the remote location.

2. The system of claim 1, wherein:
    the main propeller is disposed to provide a stabilizing airflow to the wing unit propellers.

3. The system of claim 1, wherein:
    the housing is configured about the main propeller and wing unit propellers so as to provide a portion of the main propeller airflow to the wing unit propellers.

4. The system of claim 1, wherein the housing includes:
    an outer shell;
    hollow tubes that provide openings in the outer shell configured to direct airflow around and through the outer shell so that the outer shell is effectively porous with regard to cross winds.

5. The system of claim 1, wherein flight control is provided by adjusting the relative speeds of the main propeller and wing unit propellers.

6. The system of claim 1, further comprising:
    video camera and global positioning system (GPS) sensors integrated with the UWB radar sensor imaging for providing real-time feedback of information.

7. The system of claim 1, wherein:
    real-time feedback of information from the ultra-wideband (UWB) radar imaging system is available on a display for remote control operation of the aircraft.

8. A method comprising:
    remotely controlling flight of an aircraft using a main propeller and a plurality of wing unit propellers for lift and propulsion;
    operating an ultra-wideband (UWB) radar imaging system from the aircraft; and
    transmitting information from the UWB radar imaging system to a display at a location remote from the aircraft.

9. The method of claim 8, wherein the step of remotely controlling flight further comprises providing a stabilizing airflow from the main propeller to the wing unit propellers.

10. The method of claim 8, further comprising: scanning, from the aircraft, a general area of interest using the UWB radar imaging system; performing signal analysis using data provided by the UWB radar imaging system to isolate a target of interest from clutter; imaging the target of interest on the display at the location remote from the aircraft.

11. The method of claim 8, further comprising:
    scanning, from the aircraft, a general area of interest using a first UWB radar system operating at a first center frequency;
    performing a coarse analysis using data provided by the first radar system to isolate a target of interest from clutter;
    imaging the target of interest on the display at the location remote from the aircraft;

remotely directing the aircraft to scan the target using a second ultra-wideband (UWB) radar system operating at a second center frequency that is higher than the first center frequency;
performing a fine analysis using narrow beam data provided by the second radar system; and
imaging the results of the fine analysis on the display at the location remote from the aircraft.

12. The method of claim 8, further comprising:
stabilizing the aircraft with a flow of air directed from the main propeller to the wing unit propellers using the housing.

13. The method of claim 8, further comprising:
reducing an impact of airflow on the outside of the aircraft by directing the airflow through hollow tubes that open to an outside of an outer shell of the aircraft.

14. The method of claim 8, further comprising:
controlling flight of the aircraft by adjusting the relative speeds of the main propeller and wing unit propellers.

* * * * *

UNITED STATES PATENT AND TRADEMARK OFFICE
CERTIFICATE OF CORRECTION

PATENT NO. : 8,573,529 B2
APPLICATION NO. : 13/037804
DATED : November 5, 2013
INVENTOR(S) : Farrokh Mohamadi It is certified that error appears in the above-identified patent and that said Letters Patent is hereby corrected as shown below:

Delete Title Page, and replace with new Title Page. (Attached)

In the Drawings

Delete Drawing Sheets 1-7, and replace with Drawing Figures 1-7. (Attached)

Signed and Sealed this
Fourth Day of February, 2014

Michelle K. Lee
*Deputy Director of the United States Patent and Trademark Office*

(12) United States Patent
Mohamadi

(10) Patent No.: US 8,573,529 B2
(45) Date of Patent: Nov. 5, 2013

(54) STANDOFF DETECTION OF MOTION AND CONCEALED UNEXPLODED ORDNANCE (UXO)

(75) Inventor: Farrokh Mohamadi, Irvine, CA (US)

(73) Assignee: Farrokh Mohamadi, Newport Beach, CA (US)

( * ) Notice: Subject to any disclaimer, the term of this patent is extended or adjusted under 35 U.S.C. 154(b) by 300 days.

(21) Appl. No.: 13/037,804

(22) Filed: Mar. 1, 2011

(65) Prior Publication Data
US 2011/0210883 A1   Sep. 1, 2011

Related U.S. Application Data

(60) Provisional application No. 61/309,379, filed on Mar. 1, 2010.

(51) Int. Cl.
*B64C 29/00* (2006.01)

(52) U.S. Cl.
USPC .................. 244/23 A; 244/23 C; 342/21

(58) Field of Classification Search
USPC .................. 244/23 C, 23 A, 12.1–12.6
See application file for complete search history.

(56) References Cited

U.S. PATENT DOCUMENTS

| | | | |
|---|---|---|---|
| 1,552,742 A * | 9/1925 | Howard | 244/21 |
| 2,077,471 A * | 4/1937 | Fink | 244/12.3 |
| 4,469,294 A * | 9/1984 | Clifton | 244/12.3 |
| 6,364,253 B1 * | 4/2002 | Cavanagh | 244/190 |
| 7,830,989 B2 * | 11/2010 | Mohamadi | 375/343 |
| 7,884,757 B2 * | 2/2011 | Mohamadi et al. | 342/175 |
| 7,931,239 B2 * | 4/2011 | Pedersen et al. | 244/189 |
| 8,322,647 B2 * | 12/2012 | Amraly et al. | 244/12.4 |
| 2008/0223993 A1 * | 9/2008 | Spirov et al. | 244/23 A |
| 2008/0252546 A1 * | 10/2008 | Mohamadi | 343/853 |
| 2010/0140415 A1 * | 6/2010 | Goossen | 244/23 A |
| 2010/0225520 A1 * | 9/2010 | Mohamadi et al. | 342/21 |
| 2010/0301168 A1 * | 12/2010 | Raposo | 244/171.2 |
| 2011/0102233 A1 * | 5/2011 | Johnson | 342/22 |
| 2011/0102235 A1 * | 5/2011 | Abdillah et al. | 342/22 |
| 2011/0115666 A1 * | 5/2011 | Feigin et al. | 342/22 |
| 2011/0115667 A1 * | 5/2011 | Feigin et al. | 342/22 |
| 2011/0227778 A1 * | 9/2011 | Mohamadi et al. | 342/22 |
| 2012/0119935 A1 * | 5/2012 | Mohamadi et al. | 342/22 |
| 2013/0050007 A1 * | 2/2013 | Ammar | 342/22 |

* cited by examiner

*Primary Examiner* — Christopher P Ellis
*Assistant Examiner* — Medhat Badawi
(74) *Attorney, Agent, or Firm* — Haynes and Boone, LLP

(57) ABSTRACT

A surveillance system includes a multi-propeller aircraft having a main propeller and a plurality of wing unit propellers; a housing that houses the main propeller and the wing unit propellers; an ultra-wideband (UWB) radar imaging system; a control system for controlling flight of the multi-propeller aircraft from a remote location; and a telemetry system for providing information from the ultra-wideband (UWB) radar imaging system to the remote location. A method includes: remotely controlling flight of the aircraft using a main propeller and a plurality of wing unit propellers with airflow from the main propeller to the wing unit propellers for lift and propulsion; operating an ultra-wideband (UWB) radar imaging system from the aircraft; and transmitting information from the UWB radar imaging system to a display at a location remote from the aircraft.

14 Claims, 7 Drawing Sheets